US006765992B2

(12) United States Patent
Dawson

(10) Patent No.: US 6,765,992 B2
(45) Date of Patent: Jul. 20, 2004

(54) EMERGENCY CALL SYSTEM AND METHOD WITH ATTENDANT AND RESIDENT PENDANT ACTUATION

(76) Inventor: Brian Dawson, 25 Carriage Creek Way, Ormond Beach, FL (US) 32174

(*) Notice: Subject to any disclaimer, the term of this patent is extended or adjusted under 35 U.S.C. 154(b) by 80 days.

(21) Appl. No.: 10/115,882

(22) Filed: Apr. 2, 2002

(65) Prior Publication Data

US 2002/0154743 A1 Oct. 24, 2002

Related U.S. Application Data

(60) Provisional application No. 60/281,518, filed on Apr. 4, 2001.

(51) Int. Cl.[7] .................................... H04M 11/00

(52) U.S. Cl. ........................ 379/38; 379/40; 379/49; 340/539.11; 455/404.1

(58) Field of Search .................... 379/37–51; 340/506, 340/531–534, 539.1, 539.11, 539.18; 455/404.1, 404.2

(56) References Cited

U.S. PATENT DOCUMENTS

| | | | | | |
|---|---|---|---|---|---|
| 3,843,841 | A | * | 10/1974 | Rubinstein | 379/38 |
| 4,064,368 | A | * | 12/1977 | Dibner | 379/38 |
| 4,510,350 | A | * | 4/1985 | Wagner et al. | 379/38 |
| 4,524,243 | A | | 6/1985 | Shapiro | 179/5 |
| 4,819,053 | A | | 4/1989 | Halavais | 342/353 |
| 4,829,285 | A | | 5/1989 | Brand et al. | 340/573 |
| 4,999,607 | A | | 3/1991 | Evans | 340/533 |
| 5,128,979 | A | | 7/1992 | Reich et al. | 379/40 |
| 5,195,126 | A | | 3/1993 | Carrier et al. | 379/45 |
| 5,337,342 | A | | 8/1994 | Kruger et al. | 379/40 |
| 5,438,607 | A | | 8/1995 | Przygoda, Jr. et al. | 379/38 |
| 5,440,301 | A | | 8/1995 | Evans | 340/870.11 |
| 5,450,064 | A | | 9/1995 | Williams, Jr. et al. | 340/574 |
| 5,521,582 | A | | 5/1996 | Kingston | 340/539 |
| 5,590,648 | A | | 1/1997 | Mitchell et al. | 128/630 |
| 5,905,436 | A | | 5/1999 | Dwight et al. | 340/573.1 |
| 5,923,253 | A | | 7/1999 | Anastasiou | 340/573.1 |
| 5,971,921 | A | | 10/1999 | Timbel | 600/300 |
| 6,032,035 | A | | 2/2000 | Webster et al. | 455/404 |
| 6,061,430 | A | | 5/2000 | Miller et al. | 379/49 |
| 6,080,106 | A | | 6/2000 | Lloyd et al. | 600/300 |
| 6,100,806 | A | | 8/2000 | Gaukel | 340/573.4 |
| 6,108,685 | A | | 8/2000 | Kutzik et al. | 709/200 |
| 6,134,303 | A | | 10/2000 | Chen | 379/49 |
| 6,150,942 | A | | 11/2000 | O'Brien | 340/573.1 |
| 6,166,639 | A | | 12/2000 | Pierce et al. | 340/573.1 |
| 6,168,563 | B1 | | 1/2001 | Brown | 600/301 |
| 6,185,410 | B1 | | 2/2001 | Greene | 455/100 |
| 6,198,390 | B1 | | 3/2001 | Schlager et al. | 340/540 |
| 6,504,908 | B1 | * | 1/2003 | Bellomo et al. | 379/38 |

* cited by examiner

*Primary Examiner*—Wing F. Chan
(74) *Attorney, Agent, or Firm*—Allen, Dyer, Doppelt, Milbrath & Gilchrist, P.A.

(57) ABSTRACT

An emergency call system includes at least one wireless receiver located at a property having a plurality of residences for receiving wireless alarm signals from resident wireless devices and reset signals from attendant wireless devices, such as pendants. The wireless device module is operatively connected to the at least one wireless receiver for determining identity of respective resident devices and determining the response time in which an attendant has responded to an alarm signal from the resident device and which the attendant resets the alarm. The "staff reset" pendant contains a unique code identifying which staff pendant was used for a reset.

14 Claims, 14 Drawing Sheets

Property Detail

| STATISTICS | You | Others |
|---|---|---|
| Number of Emergency Calls | 0.0 | 4.0 |
| Average Response Time - ECall | 0.0 | 964.0 |
| Longest Emergency Call | 0.0 | 1232.0 |
| Shortest Emergency Call | 0.0 | 658.0 |
| Number of Smoke Alarms | 0.0 | 0.0 |
| Average Response Time - Smoke | 0.0 | 0.0 |
| Longest Smoke Alarm | 0.0 | 0.0 |
| Shortest Smoke Alarm | 0.0 | 0.0 |
| % of Residents Checked In | 0.0 | 0.0 |
| Current Number of Open Alarms | 0.0 | 0.0 |
| Oldest Open Alarms | 0.0 | 0.0 |

Create Your Global Report!

EMERGENCY CALL SYSTEM AND METHOD WITH ATTENDANT AND RESIDENT PENDANT ACTUATION

RELATED APPLICATION

This application is based upon prior filed provisional application Serial No. 60/281,518 filed Apr. 4, 2001.

FIELD OF THE INVENTION

This invention relates to emergency call systems, and more particularly, this invention relates to emergency call systems that monitor multiple resident apartments.

BACKGROUND OF THE INVENTION

The senior living industry is rapidly growing and the need for advanced technology in communications, safety, and security systems is mandatory in order to maintain, track and respond to alarm signals, including smoke warnings, common area emergency alarms, door alarms, pendant alarms actuated by a resident, and other security and alarm features common in the senior living industry. Various prior art systems have been used in this industry, including direct connect, i.e., hard-wired systems, wireless systems, and telephone systems. For example, a direct connect (hard-wired) system allows reliable integration with dedicated wiring to provide reliability. Fixed location devices located within each resident apartment of a retirement property can initiate a call. An example would be an intercom. Smoke detectors can be used and emergency call stations, such as those having a pull cord, a check-in station, a door switch, corridor speaker, security screen, and/or other hard-wired devices as known to those skilled in the art are commonly used in direct connect systems. A drawback of a hard-wired system is the requirement of a dedicated hard-wired physical cable or line, and the expense associated with a direct copper connection or other similar communications line connection.

A wireless system, on the other hand, offers the advantage such that a dedicated copper line or other hard-wired communications line is not required. Wireless systems are typically easy to install and include personal transmitters, such as wireless pendants worn about the neck of a user, which can be user actuated by a resident to generate an alarm signal to a wireless receiver. A wireless station, such as a check-in station or emergency call station, also can be used. These devices allow a user to pull an emergency cord or line for generating a wireless alarm signal to the wireless receiver. The alarm signal can be coded for origin and identification of a resident. Wireless receivers receive the alarm signal and forward the alarm signal as an electrical communication alarm signal to a central console. One drawback of a wireless system is the lack of perfect coverage in any building and the added requirement that most residents must wear a pendant or other type of personal transmitter at all times.

Another type of system uses a standard telephone or similar device to provide a telephone system that combines some features of each of the wireless and direct connect systems. This system, however, lacks the ability to integrate common area emergency calls, door alarms, and similar alarms and calls because signals are generated from the telephone through a telephone company and require a phone line connection.

Other drawbacks of similar prior art emergency call systems include a lack of system integration and the tracking of emergency calls, alarms, and proper databases for maintaining records. Additionally, an increased number of senior residents living in larger numbers of geographically spaced properties complicate different services associated with the systems, including administrative services, increased control, database upkeep, tracking, and report generation.

SUMMARY OF THE INVENTION

The present invention is advantageous and provides an emergency call system that integrates direct connect (hard-wired), wireless and telephony systems into one emergency call system. Thus, the disadvantages of using individual systems are minimized, while the advantages of each system can be advantageously used to maintain control over an entire emergency call system, while enhancing various functions, such as report generation.

An emergency call system includes at least one wireless receiver located at a property having a plurality of residences for receiving wireless alarm signals from resident pendants and reset signals from attendant pendants. A wireless device module is operatively connected to the at least one wireless receiver for determining identity of respective resident pendants and determining the response time in which an attendant has responded to an alarm signal from the resident pendant.

In one aspect of the present invention, a computer is operatively connected to the wireless device module and maintains a database of alarm events pertaining to any alarm and reset signals. The wireless alarm signals and reset signals from respective resident and attendant pendants are packets having identifiers for identifying the identity of a respective resident or attendant. A printer is operatively connected to the wireless device controller and prints a report of alarms and response times.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because one integrated emergency call system in a single head-end platform allows control over a direct connect (hard-wired) subsystem, a wireless subsystem and/or a telephone subsystem, allowing complete coverage of the various residences and other locations at a single property location. The system of the present invention permits the seamless integration of these disparate call systems into one head-end platform. Also, with the use of a simple home computer, monitoring station, or e-mail device, reports can be generated for use by managers via data flow through a communications network, such as the internet. Selective data can be downloaded for review and analysis, even at home. In some cases, managers can be notified of an exceptional situation, such as when an alarm signal went unanswered for a prorated period of time. With the present invention, it is also possible to establish when an alarm signal generated by a resident was responded to by an attendant. When an attendant responds, the attendant presses their own pendant and then the resident pendant, resetting the wireless system and indicating the response time to the system, and which attendant responded to the alarm.

Figure 1A:
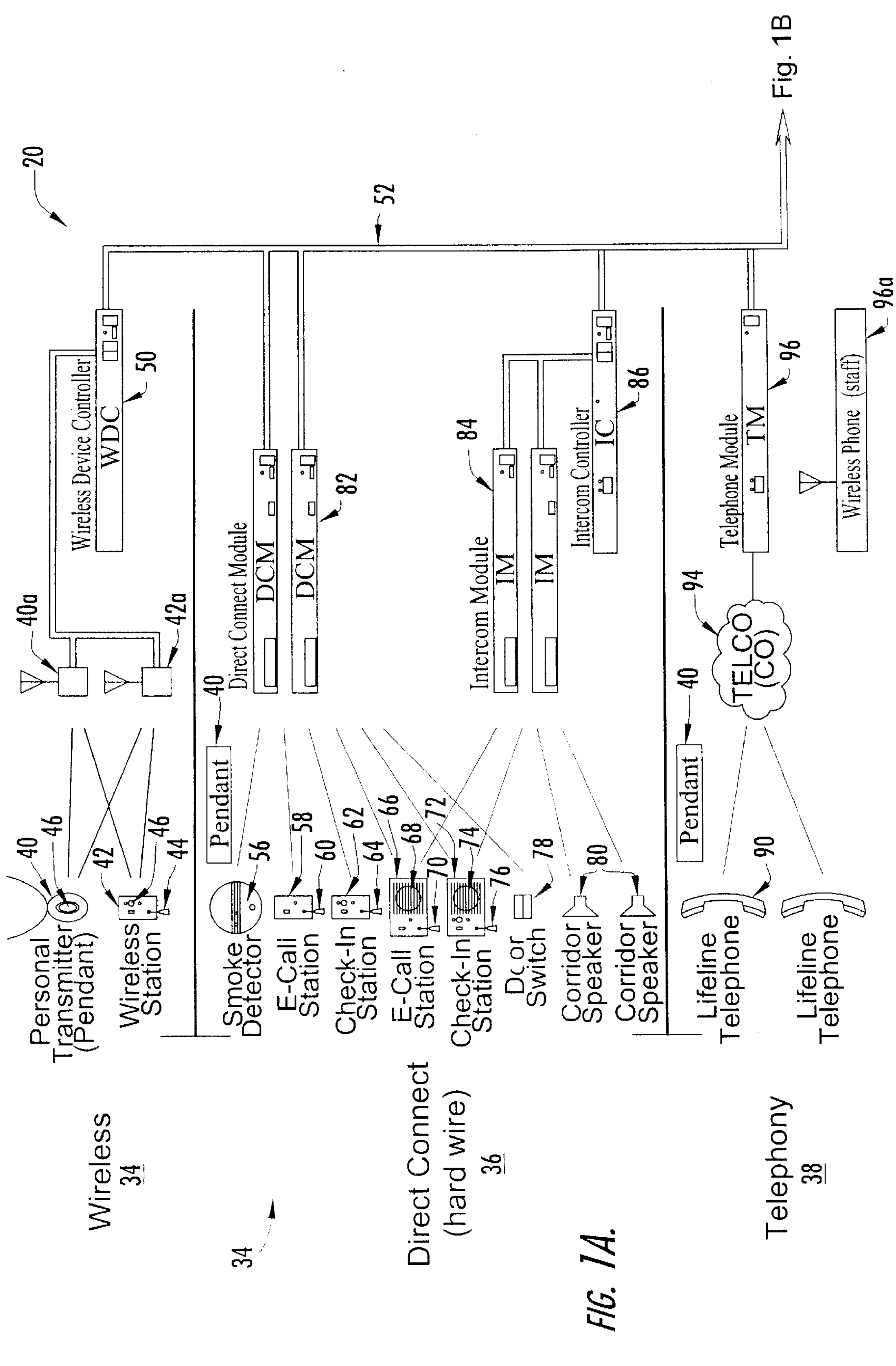
FIGS. 1A and 1B show in block diagram the emergency call system of the present invention, and illustrate the wireless, direct connect and telephone subsystems having modules that are operative with the bus controller through a common bus in a head-end platform.
Figure 1B:
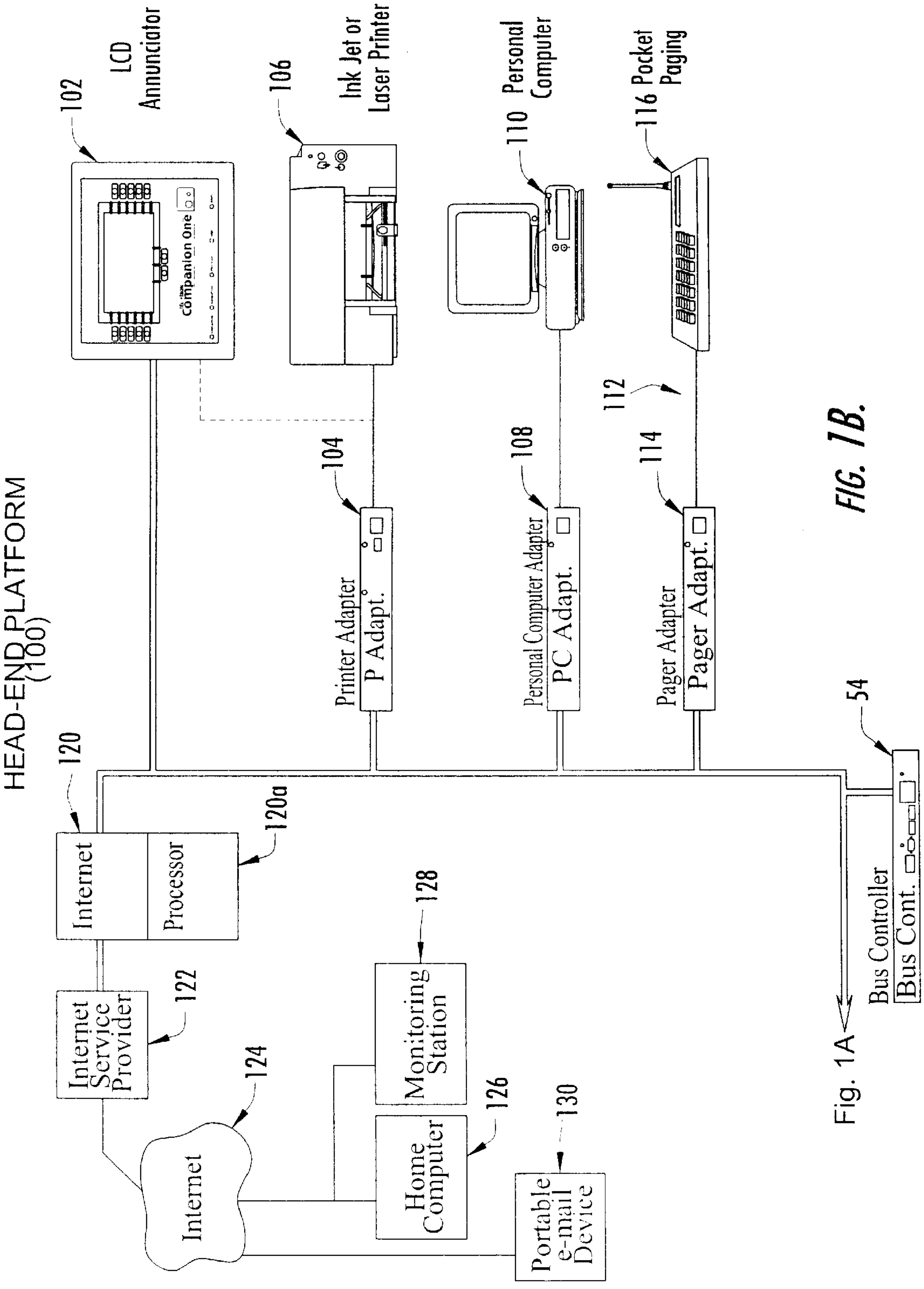

Greater details of the emergency call system 20 of the present invention are shown in FIGS. 1A and 1B. As illustrated, one emergency call system 32 is associated with each property (premises) and is responsive to alarm events, including smoke detector alarms, personal transmitter alarms, e.g., pendants or telephone calls. Each emergency call system includes one of at least a wireless subsystem 34, a direct connect subsystem 36, and a telephone subsystem 38, as shown in FIG. 1A. The subsystems are controlled by modules integrated into one head-end platform 100 and plugged by modules into a data bus 54*a*, as explained below.

The wireless subsystem 34 includes at least one personal transmitter unit 40 formed as a pendant that is typically worn around the neck by a resident of the premises. The unit 40 could be other types of transmitter pendants or wireless devices, as known to those skilled in the art. A resident in trouble can actuate the pendant or it can be actuated, such as by bodily functions (e.g., temperature decrease, fever, etc.) or other means. A wireless alarm signal is generated to a wireless receiver 40*a*. Usually wireless receivers are placed at 100 foot centers, such as by providing a wireless system placed every 10 rooms or thereabouts within a retirement community. A wireless emergency station 42 can include a pull line 44 or toggle, as known to those skilled in the art. A resident, who is having an emergency, can pull the emergency line 44 to generate a wireless alarm signal that is picked up by wireless receiver 40*a*, 42*a*. The wireless receivers 40*a*, 42*a* receive the generated alarm signals and are operatively connected to a wireless device module (WDC) of the head-end platform 100, which, in turn, is operatively connected to a plurality of wireless receivers located throughout the one property at a plurality of locations. The wireless subsystem not only uses pendants that are worn by residents, but can also use other personal and wireless transmitters, as known to those skilled in the art. It is possible for a wireless transmitter to be contained within a wrist watch or key chain.

In operation, if a resident presses the transmitter button 46, such as on a pendant, wrist watch or key chain, or pulls the pull line 44, the wireless alarm signal is generated to a wireless receiver. In the wireless subsystem, there is no two-way communication. As is typical with these elderly and senior care facilities where high reliability is required, the wireless transmitters and/or pendants typically would use a lithium battery or other power device known to those skilled in the art. An advantage of the wireless subsystem 34 is that any receivers and transmitters can be added to existing structures as add-ons, and installed as original equipment or replace standard emergency call stations. Wireless emergency call stations 42 include the standard pull-for-help toggles or pull lines 44 and/or buttons 46. A wireless device module 50 as part of the head-end platform receives converted alarm signals from the wireless receivers 40*a*, 40*b*, and transmits electrical alarm signals according to a predefined protocol over a common BUS 52 to a BUS controller 54 that is operative with the direct connect (hard-wired) subsystem 36 and telephone subsystem 38 through respective modules at the head-end platform.

As shown in FIG. 1A, the direct connect subsystem 36 includes various types of hard-wired devices, typically positioned with an apartment, such as a smoke detector 56, emergency call station 58 with the pull line 60, a check-in station 62 with a pull line 64, an emergency call station 66 with an intercom speaker 68 and pull line 70, a check-in station 72 with an intercom speaker 74 and pull line 76, a door switch 78, corridor speaker 80, and other devices such as a security screen (not shown), also known as a wander screen, as known to those skilled in the art. Wireless pendants 40 could also be used and be interoperative with a receiver located in one of the stations. Naturally, these are only non-limiting examples and other devices suggested by those skilled in the art are possible. A direct connect module (DCM) 82 is operative with the various devices. An optional intercom module (IM) 84 is operative via an intercom controller (IC) 86 with emergency call stations, check-in stations, and corridor speakers for allowing two-way communication.

The direct connect emergency call stations 66 and check-in stations 72 permit staff members of retirement communities to have direct, two-way communication into a resident's apartment or premises in case of any emergency. Any type of direct connect emergency call station (check-in or not) can have two-way voice as long as the intercom type station has a speaker. This is advantageous because the sound of a human voice can be reassuring to any resident in distress. In the direct connect subsystem, it is possible that there are also some check-in stations without speakers. A 900 megahertz phone or other phone device can display the type and location of the emergency. Because an addressable intercom can be used, the staff no longer is required to maintain constant access to a control console. Using emergency information received through a phone or other similar device, the staff members can respond rapidly and appropriately to the needs of residents. The phone can be used to address instantly communication with some or all residents and different staff members through designated speakers as part of a cordless speaker or other speaker system.

Check-in stations 62 used on the direct connect subsystem advantageously allow a means for ensuring that all residents are healthy and feeling well. These stations 62 can act as a roll call, such that staff can maintain an awareness of each resident. For example, each morning residents could press a button located on the check-in station 62 to proclaim that they are up and well. If there is no check-in by a resident, then an alert signal could be generated after a predetermined period of time. The check-in station 62 provides an advantageous method to maintain electronic monitoring of residents that staff members may not see. It should be understood that "check-in" is also available on the previously described wireless subsystem and the telephone subsystem, but operates differently by allowing a button to be pushed as in a wireless subsystem.

The telephone subsystem 38 can be used as a retrofit installation where voice-to-voice communication is required. A resident telephone 90 connects directly to the telephone module 96 via the telephone company switching system 94, such as a public switched telephone network. The telephone module 96 in turn can connect to a wireless telephone 96*a* used by an attendant, such as a nurse.

A telephone adapter card for communicating with staff phones could be included within the module. The telephone module 96 allows connection and control of many different telephones within the overall system. An example of a resident telephone that could be used in the present invention is a telephone manufactured by Lifeline®.

As shown in FIG. 1A, the wireless device module 50, direct connect module 82, intercom module 84, and intercom controller 86, and telephone module 96 connect into the common BUS 52, which is operatively connected to the BUS controller 54 to control the various and numerous alarm signals and other data signals generated by the various modules used in the wireless, direct connect and telephone subsystems 34, 36 and 38. The BUS controller 54 and other modules operatively form a head-end platform 100 where various alarm signals are captured and processed. The bus controller could include bus circuitry and appropriate plug-in points for connecting other modules as suggested by those skilled in the art. The head-end platform 100 can include different components, such as the illustrated LCD annunciator 102, a printer adapter 104 with associated ink jet, laser or other printer 106, a personal computer adapter 108 connected to a personal computer 110, a paging apparatus 112 for generating a paging signal in response to an alarm signal, such as pendant actuation or a line pull on an emergency call station. The paging apparatus 112 includes a pager adapter 114 and pager base station 116. The various printer, personal computer, and pager adapter could be formed as adapter cards to fit into slots on various modules in the head-end platform 100.

In accordance with the present invention, an internet module 120 formed as an internet adapter, which could have an associated processor 120*a*, is connected to the BUS 52 and receives alarm data from various modules and generates corresponding data in association with other devices, like a computer 110, and transports the data through an internet service provider (ISP) 122 over the Internet 124 to a home computer 126, monitoring station 128 or e-mail device 130. The internet module could also connect directly to the telephone company to a call network server, which is accessed by users through the web as described below. The internet module is operative with three subsystems individually or as a group and can be connected to other systems not having a data bus and bus controller by techniques known to those skilled in the art.

The annunciator 102 is typically an LCD based device that uses soft buttons and a menu structure to display and control the emergency call system and associated alarm. The annunciator 102 can work in operation with the associated printer 106. The personal computer 110 allows supervision and control of emergency calls, various alarms, and resident check-in, and is operative with an associated interface, such as a graphical user interface, to provide instant access of resident information, alarm calls, and alarm conditions, with an appropriate database for record keeping. The printer 106 provides a printed report of all system events. Essential information and data can be brought up via the personal computer 110 when an alarm is sounded by a specific resident, such as the name of the appropriate physician, allergies, next-of-kin, and pastor. Different report capabilities can track date, response times and check-in history and can be stored in the computer for rapid retrieval.

The paging apparatus in the form of a cord, module or other means 112 includes the pager adapter 114 and pager base station 116. If there is an operator console, it does not have to be staffed 24 hours a day. The pager adapter 114 could receive various alarm signals or telephone alarm calls typically via the BUS (in some cases wireless), and generate a signal to the base station to generate a paging signal to a pager carried by at least one staff member. Naturally, pagers can be small, lightweight and offer an audio or silent alarm option.

FIG. 1B also illustrates that the BUS controller 54 is operative to control alarm signals and telephone alarm signals to the internet module 120, where the associated processor 120*a* can process any required data for the generation of alarm data signals with the appropriate codes to an Internet Service Provider 122 or to a server (FIG. 1C) for transmission as data packets across the Internet 124 into the home computer 126 or other monitoring station 128. The internet module can also work with other components of the head-end platform 100.

Figure 1C:
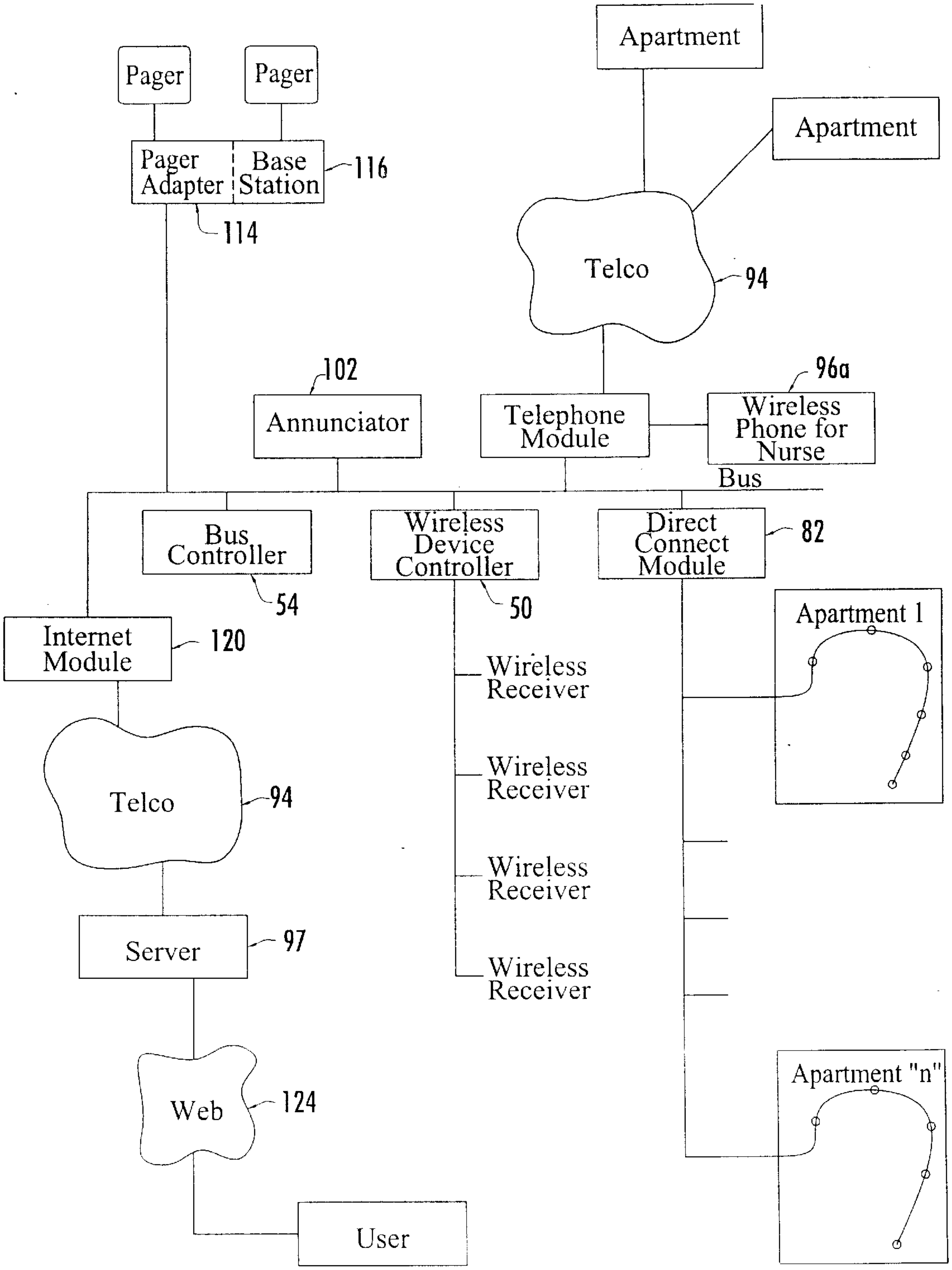
FIG. 1C is a block diagram showing the data bus and various modules that can be connected to the data bus.

FIG. 1C illustrates another block diagram showing details of the various modules and the data bus 54*a* and the interconnection among various components of the emergency call system of the present invention. The data bus 54*a* is illustrated as a straight line and can be part of the bus controller 54, which can include various jacks for connection of modules, such as the annunciator 102, telephone module 96, wireless device module 50 and direct connect module 82. The pager adapter (module) 102 and internet module 120 are connected into the bus. Telephones contained within various departments of the property connect via the telephone company to a telephone module 96 of the present invention, which in turn, connect to the wireless phone 96*a* for the staff. The internet module 120, in one aspect of the invention, connects to the telephone company network 94, and in turn, connects to a system server 97 that is operated by the system operator. The server, in turn, can connect into the internet 124 and via the web to a user such as a manager. The wireless device module includes another bus with various wireless receivers 40*a* connected onto the bus as known to those skilled in the art. The direct connect module connect to another bus with various hard-wired connections that extend into apartments where the various dots indicate the different device, as shown in FIG. 1A.

Figure 1D:
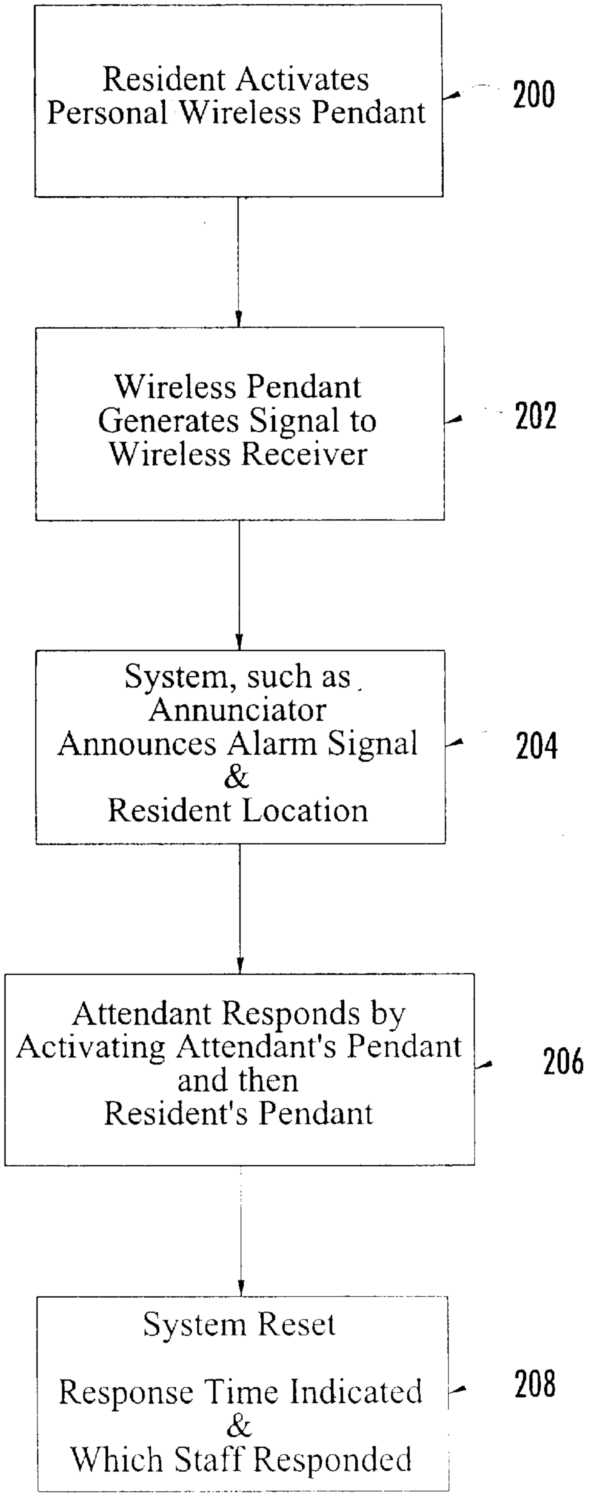
FIG. 1D is a flow chart illustrating a method of operating the emergency call system where an attendant responds to the alarm signal for clearing the system after an alarm signal is generated and/or determining the response time to the alarm signal received from a wireless device of a resident.

FIG. 1D illustrates a flow chart of the present invention where a wireless device module and annunciator can be cleared using resident and attendant pendants. For example, a resident actuates a wireless pendant that they could be wearing at block 200. The alarm signal is generated to the wireless receiver and into the wireless device module as shown at block 202. The annunciator is actuated, which in turn, could actuate a pager or a staff phone through means known to those skilled in the art (block 204). A staff member responds and resets the system by touching first his own pendant that emitted the wireless signal and then touching the resident pendant (block 206). The system is reset and the system, such as through the annunciator or other means, determines the length of time the staff member took to respond and which staff member responded. The "staff reset" pendant contains a unique code identifying which staff pendant was used for a reset.

As noted-before, if a long period of time is taken to respond, an alert or other notification could be sent via the internet to a manager at home or to another staff member through appropriate means.

FIGS. 2–10 illustrate the graphical user interface (GUI) 132 of the present invention, used not only for tracking operation of the emergency call system, but also allowing data entry into the system, even by a home computer or at a remote location via the internet. This is advantageous for use by a manager or other individual having the necessary access to the system, but located away from a senior community or operations administration center where the personal computer 110 is available. Individuals having different levels of security could obtain access to different portions of the system.

Figure 2:
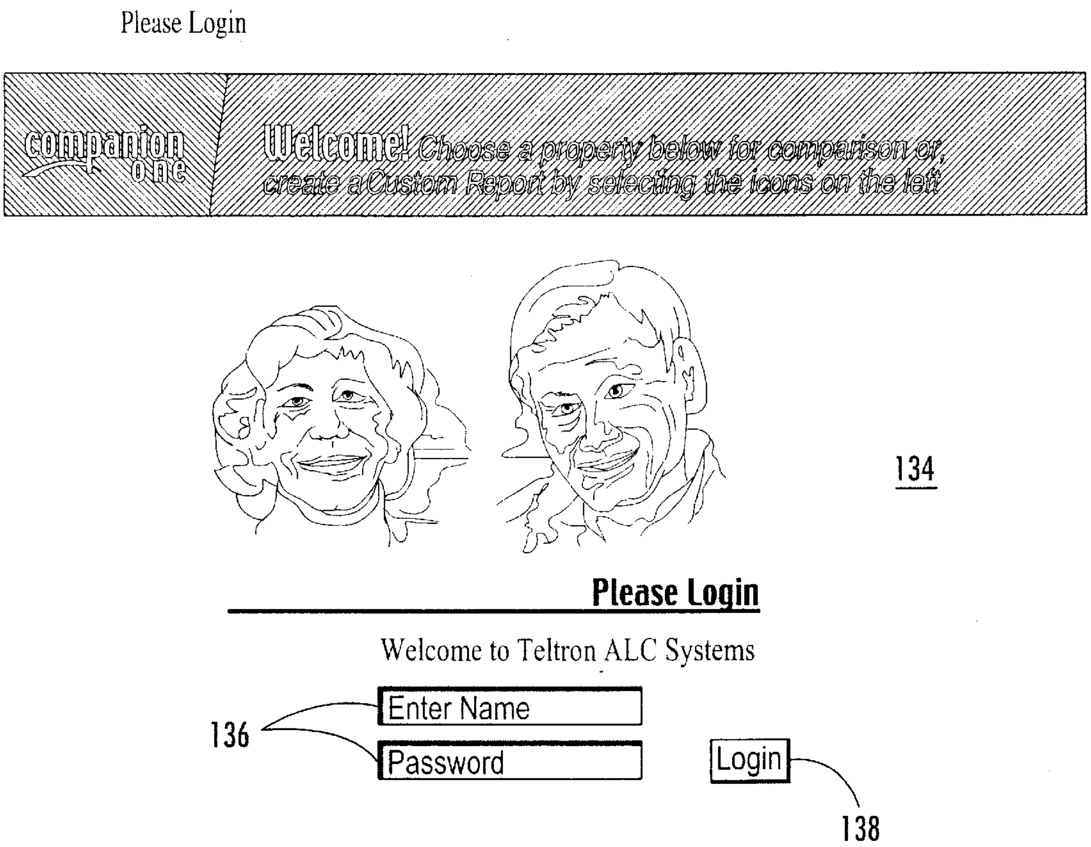
FIGS. 2–8 show on-line screens as part of the graphical user interface used with the emergency call system of the present invention.
Figure 3:
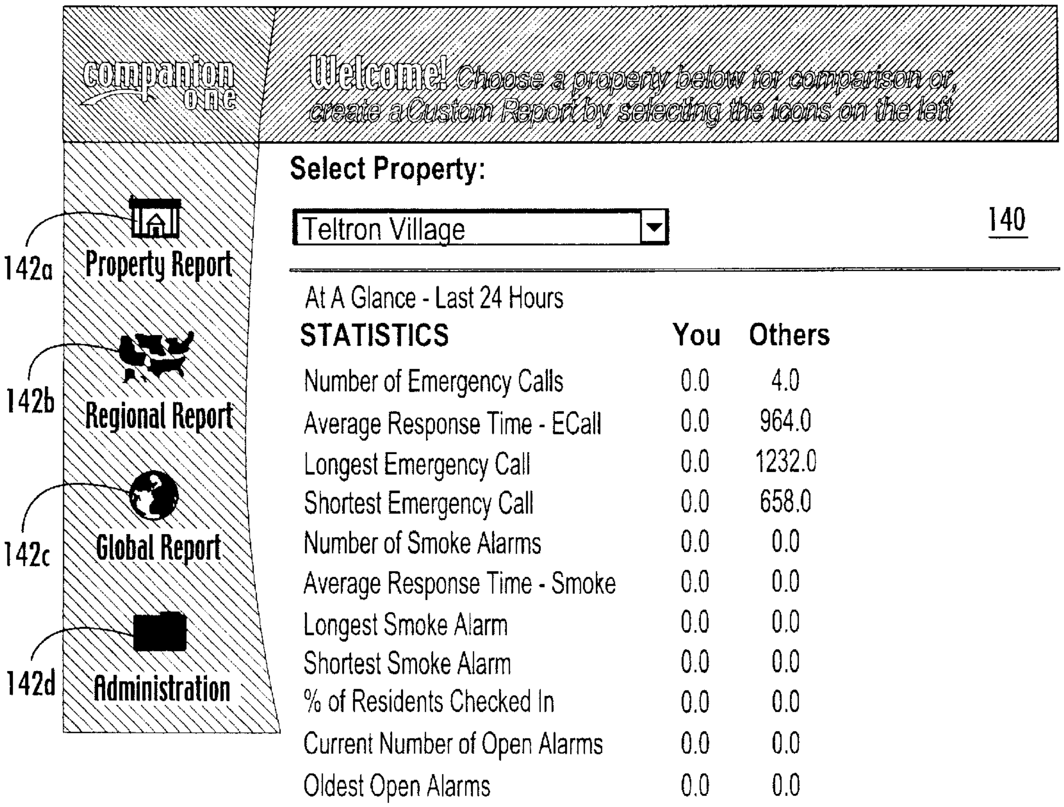
Figure 4:
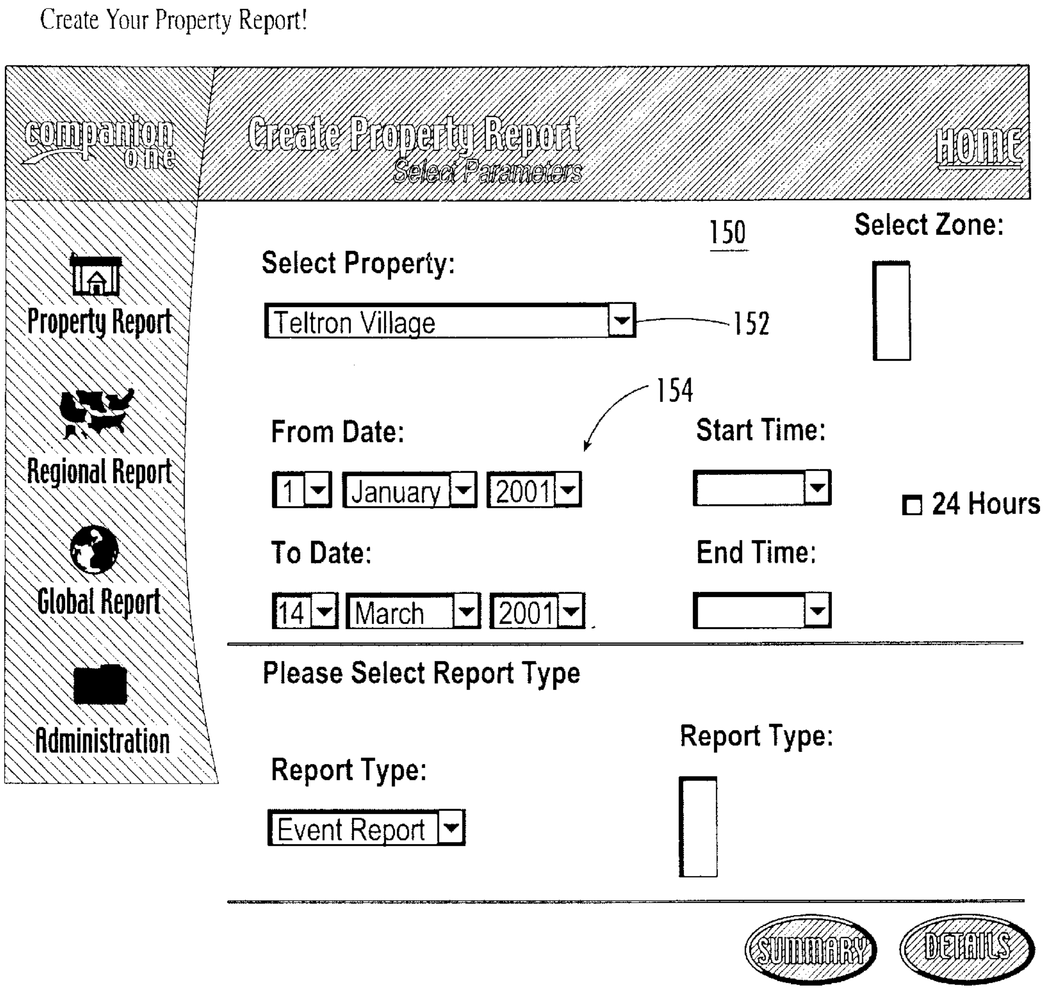

After access is granted to the system, such as by clicking an icon or other means, a welcome page 134, as shown in FIG. 2, is displayed, and requires entry of a log-in-name and security password in respective data entry boxes 136. After pressing login 138, a report window 140 could display a number of icons 142 and for generating a property report, regional report, global report or administration report. In the illustrated example, the property report icon 142*a* has been selected. For example, in a detailed report window 140 shown in FIG. 3, various properties, each having a separate emergency call system, could be selected and, at a glance, updated statistics for the last 24 hours could be displayed, including as a non-limiting example, the number of emergency calls, the average response time for an emergency call, the longest emergency call, the shortest emergency call, the number of smoke alarms, the average response time-smoke, the longest smoke alarm, the shortest smoke alarm, the percentage of residents checked in, the current number of open alarms, and the oldest open alarm.

Figure 5:
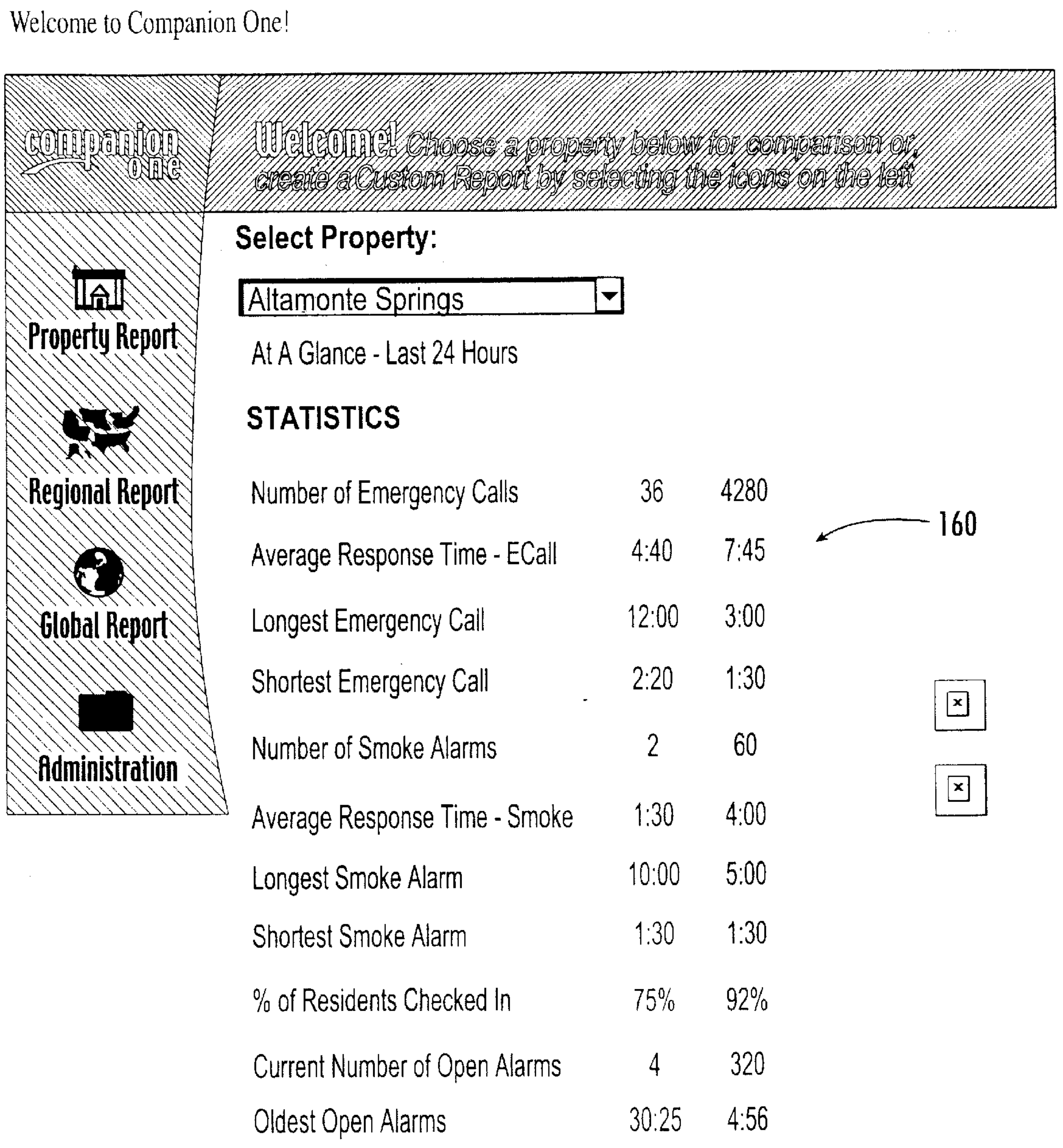
Figure 6:
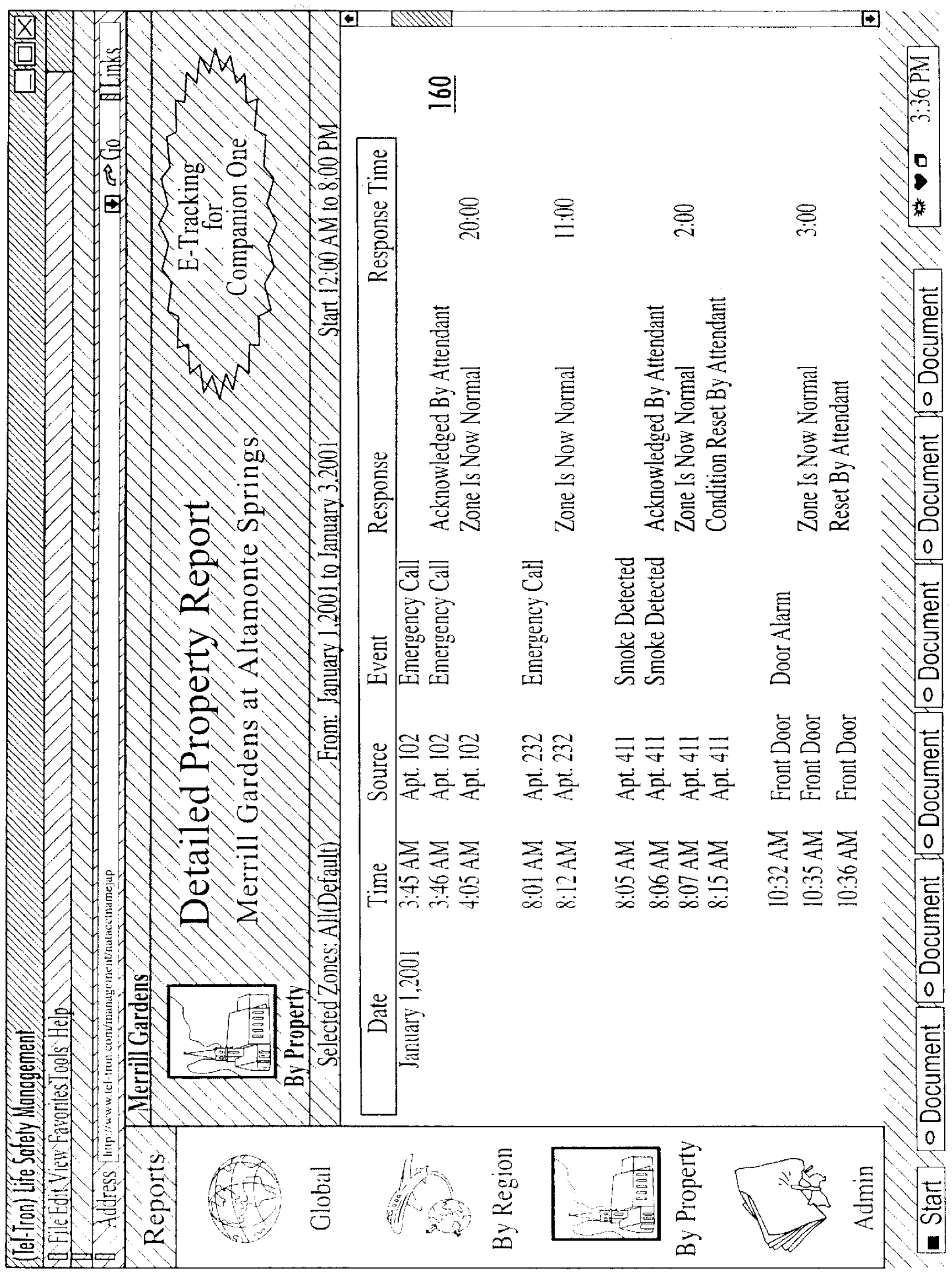
Figure 7:
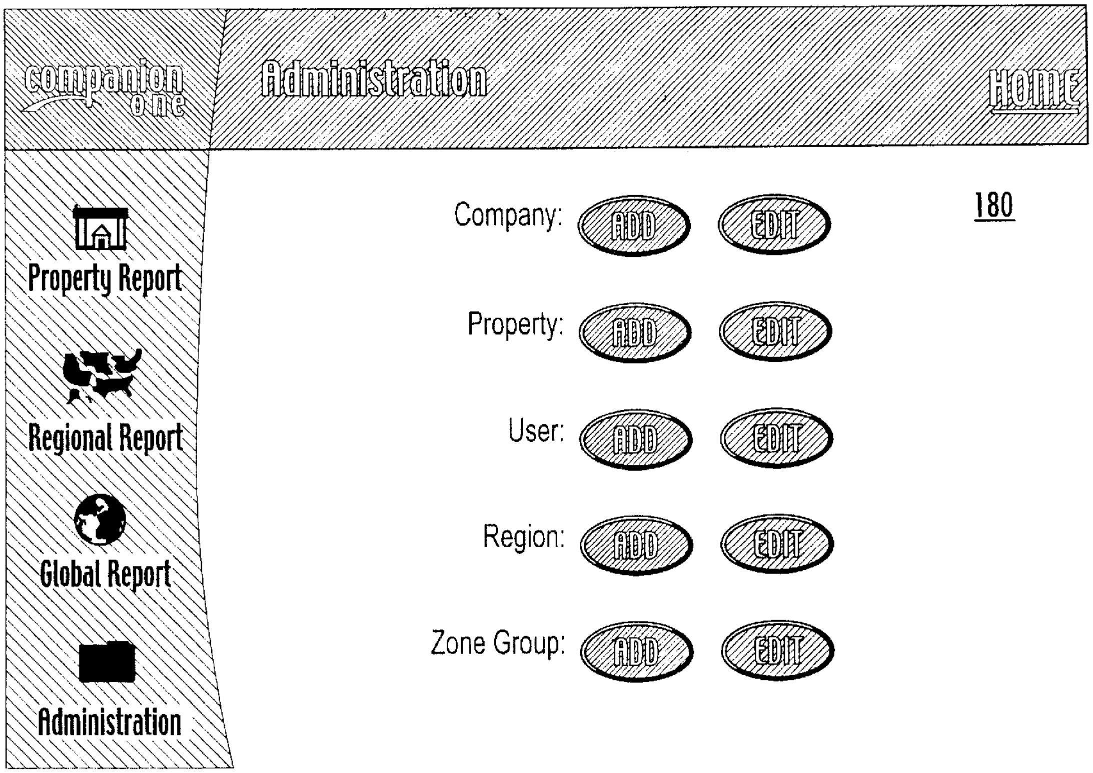

It is possible to create property reports for different properties in a create property report window 150. Different properties can be selected by means of a Select Property drop down box 152. Dates can be entered in date drop down boxes 154 with details, such as the Start and End time entered into the drop down boxes. The type of report that is selected can be determined through a drop down Report Type box 156. The statistics 160 for a selected property could be brought up, such as shown in FIG. 5. A detailed property report 170 is illustrated in FIG. 6A, where date, time, source, event, response and response time are indicated in various columns. For example, on Jan. 1, 2001, at 3:45 a.m., at apartment 102, an emergency call was received and was acknowledged by the attendant at 3:46 a.m. At 4:05 a.m., after being visited by an attendant, the zone was considered normal with a response time of 20 minutes. Other examples are given in the detailed report window of FIG. 6.

Figure 10:
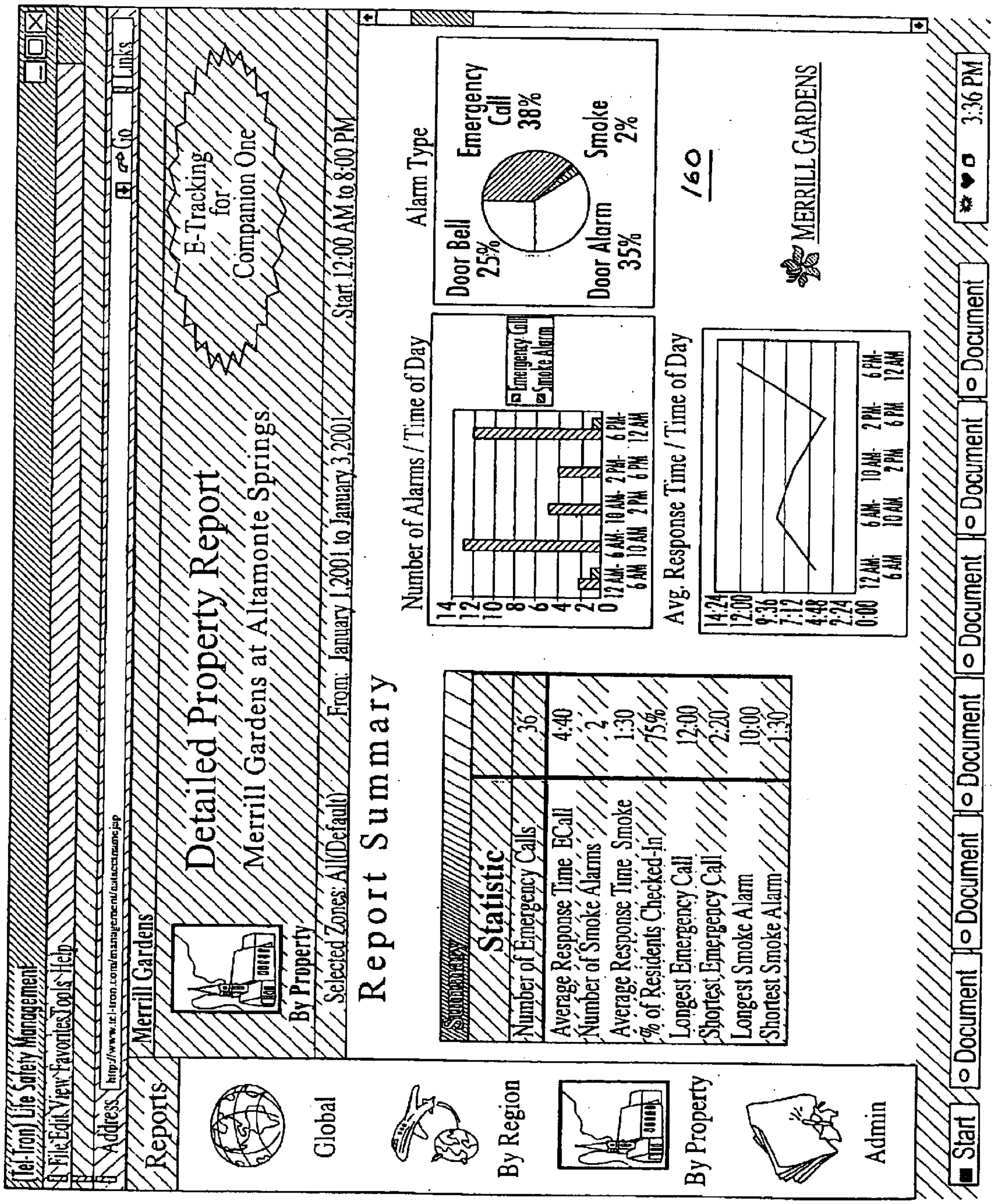
FIG. 10 shows an on-line screen for a property report window for the emergency call system of the present invention.

FIG. 10 illustrates a detailed property report window 160 showing statistical reports comprising one of at least a summary of emergency calls and their time, a bar chart displaying the number of alarms and time of day, a pie chart displaying an alarm type, and a line chart displaying an average response time based on time of day. Other details can be set forth as illustrated. For example, zones can be selected for all zones or selected zones of a selected retirement property or the more limited residence. The alarm type can include the door alarm, other alarm, emergency call or smoke detector alarm. A bar chart gives a histogram of various events, while the average response time is illustrated in a linear graph, bar chart or other format as suggested by those skilled in the art.

Figure 8:
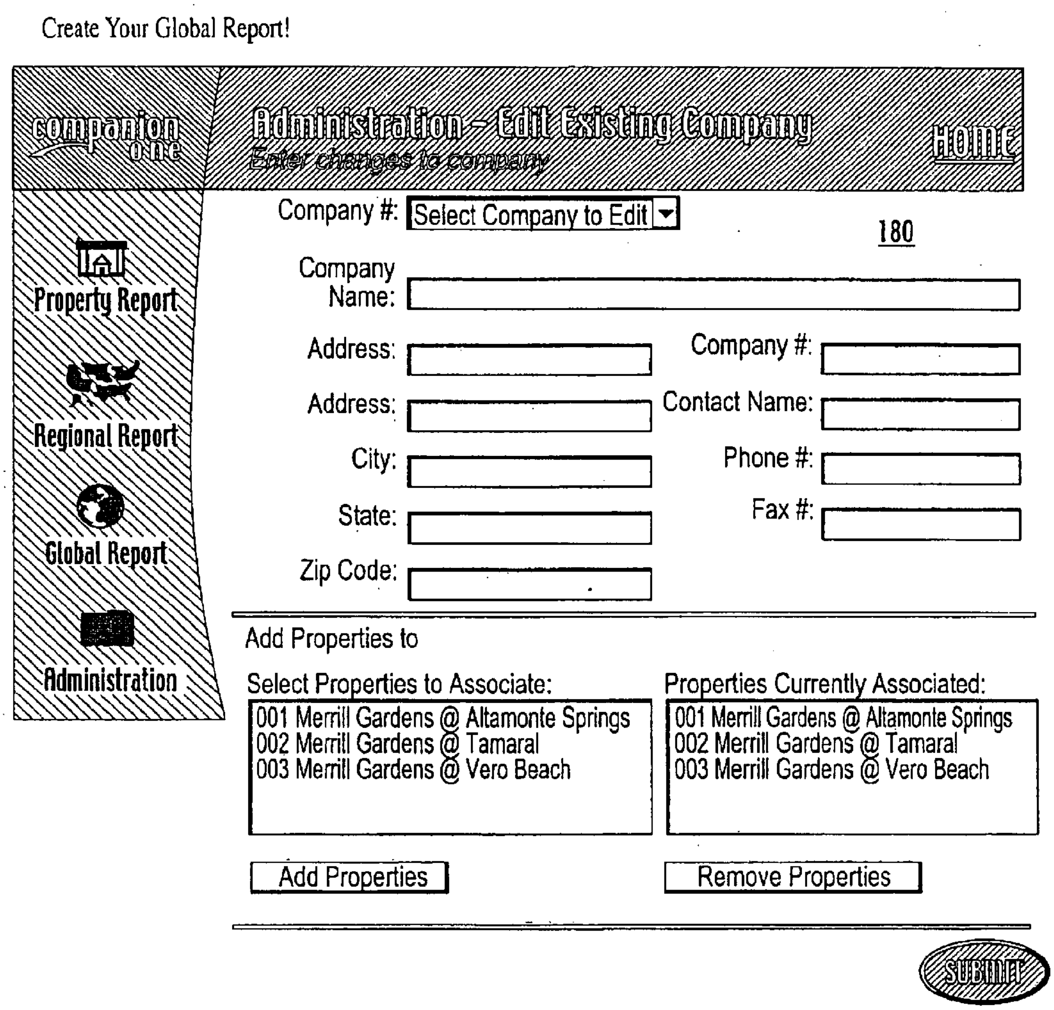
Figure 9A:
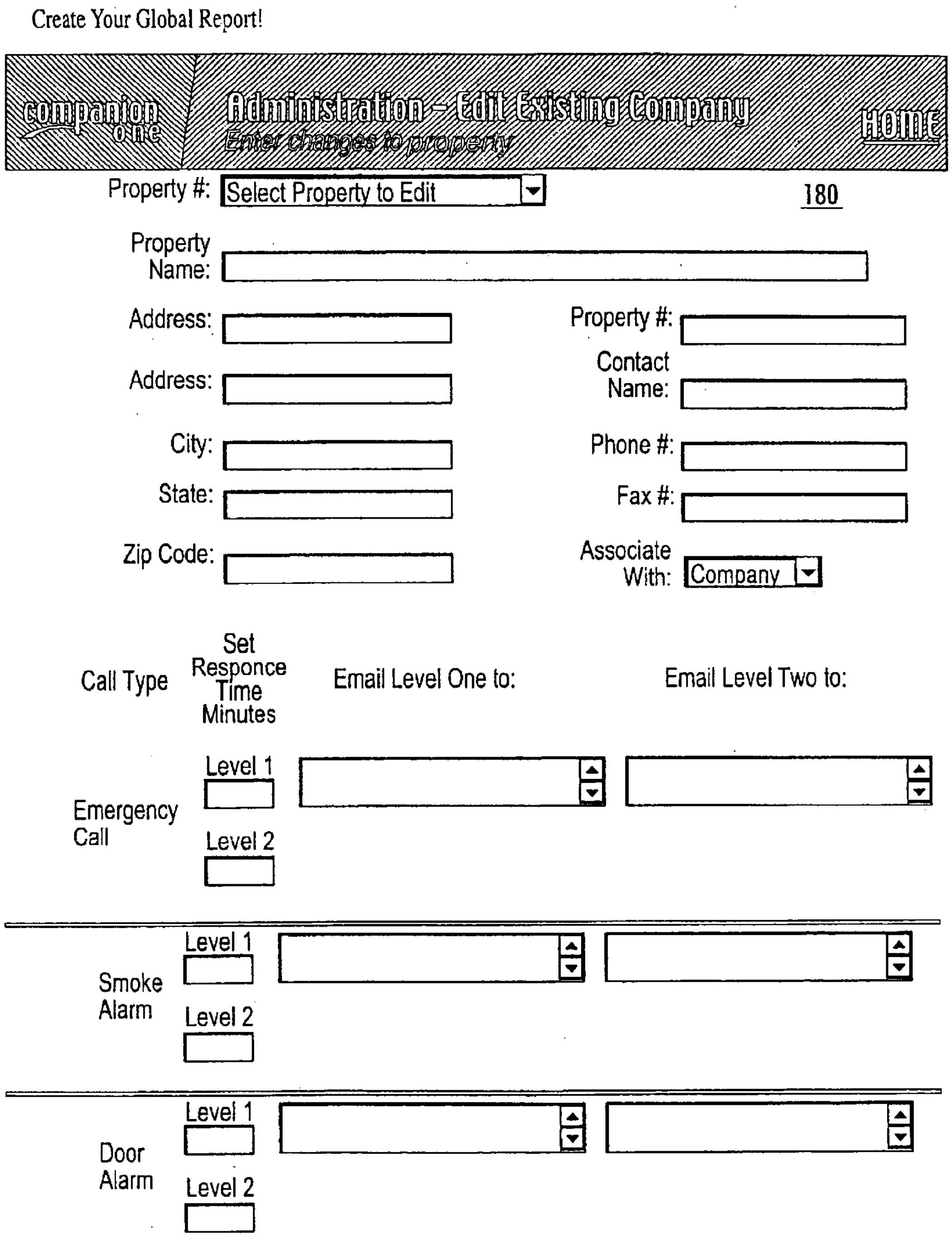
FIGS. 9A and 9B show on-line screens for an administration window used for the emergency call system of the present invention.
Figure 9B:
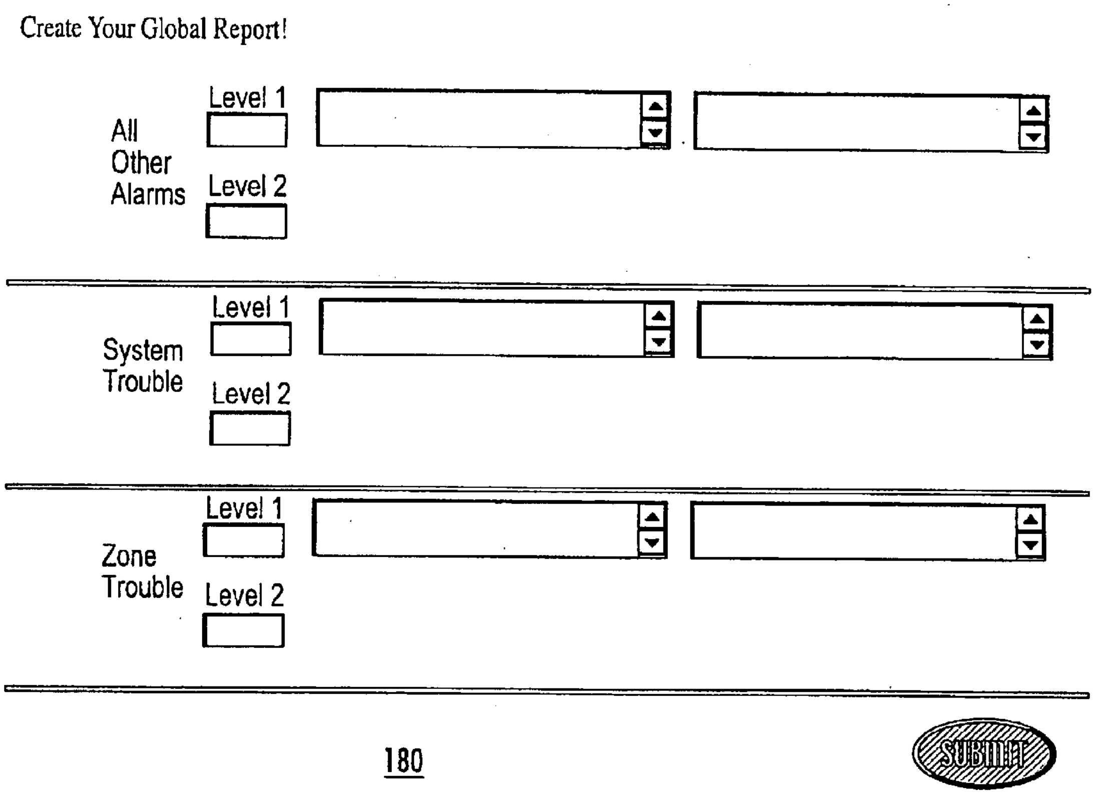

FIGS. 7–9A and 9B illustrate an administration window where various companies, properties, users, regions and zone groups can be added and edited as an edit window 180, shown in FIGS. 8, 9A and 9B. Various properties can be added and selected, including the properties, response time in minutes, and e-mails for different levels, such as level 1 and level 2. Various e-mails can be generated when alarms are received and transmitted via the internet adapter through the internet to the home computer, monitoring station, or other e-mail device. Thus, it is possible to send via the internet an e-mail message to a manager that could be halfway across the world. In a very short period of time, the manager would know that a major emergency or certain resident had signaled an alarm. This could be advantageous if a resident is a high priority type resident.

It is evident that the present invention not only allows the integration of wireless, direct connect and telephone subsystems, but also allows greater control via internet access for both e-mail notification and control via a home computer for multiple properties, each having its own emergency call system.

This application is related to copending patent application entitled, "EMERGENCY CALL SYSTEM USING WIRELESS, DIRECT CONNECT AND TELEPHONE SUBSYSTEMS" and "EMERGENCY CALL NETWORK AND SYSTEM WITH GRAPHICAL USER INTERFACE" which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An emergency call system comprising:

at least one wireless receiver located at a property having a plurality of residents and at least one resident activated resident wireless device for each respective resident and operative for transmitting a wireless alarm signal to the wireless receiver, and at least one attendant wireless device associated with an attendant who assists residents, and operative for transmitting an attendant initiated reset signal to the receiver when the attendant responds to the alarm signal initiated by the resident and resets the resident wireless device; and a wireless device module operatively connected to said at least one wireless receiver for determining identity of respective resident wireless devices associated with a resident and identity of an attendant and determining the response time in which an attendant has responded to an alarm signal from the resident wireless device.

2. An emergency call system according to claim 1, and further comprising a computer operatively connected to said wireless device module for maintaining a database of alarm events pertaining to any alarm and reset signals.

3. An emergency call system according to claim 1, wherein said wireless alarm signals and reset signals from respective resident and attendant wireless devices comprise packets having identifiers for identifying the identity of a respective resident or attendant.

4. An emergency call system according to claim 1, and further comprising a printer operatively connected to said wireless device controller for printing a report of alarms and response times.

5. An emergency call system comprising:

a data bus;

a bus controller operatively connected to said data bus for controlling data access on the data bus;

at least one wireless receiver located at a property having a plurality of residents and at least one resident activated resident wireless device for each respective resident and operative for transmitting a wireless alarm signal to the wireless receiver, and at least one attendant wireless device associated with an attendant who assists residents, and operative for transmitting an attendant initiated reset signal to the receiver when the attendant responds to the alarm signal initiated by the resident and resets the resident wireless device; and a wireless device module operatively connected to said at least one wireless receiver and data bus for determining identity of respective resident wireless devices associated with a resident and identity of an attendant and determining the response time in which an attendant has responded to an alarm signal from the resident wireless device.

6. An emergency call system according to claim 5, and further comprising a computer operatively connected to said data bus and wireless device module for maintaining a database of alarm events pertaining to any alarm and reset signals.

7. An emergency call system according to claim 5, wherein said wireless alarm signals and reset signals from respective resident and attendant wireless devices comprise packets having identifiers for identifying the identity of a respective resident or attendant.

8. An emergency call system according to claim 5, and further comprising a printer adapter and printer operatively connected to said data bus for printing a report of alarms and response times.

9. An emergency call system according to claim 5, and further comprising a pager adapter and paging base station operatively connected to said data bus for emitting a paging signal.

10. A method of operating an emergency call system using resident and attendant wireless devices comprising the steps of:

receiving at a wireless receiver operatively connected to a wireless device module a wireless alarm signal from a resident wireless device, wherein the resident wireless device is one of a plurality of resident wireless devices located at a property and each associated with a respective resident at the property; and generating a reset signal from an attendant wireless device as initiated from an attendant who assists residents and associated with the attendant wireless device when responding to the alarm signal, attending the resident, and resetting the resident wireless device for clearing the wireless device module and/or determining the response time to the alarm signal.

11. A method according to claim 10, and further comprising the step of maintaining a database of alarm events pertaining to any alarm and reset signals.

12. A method according to claim 10, and further comprising the step of forming the alarm and reset signals as packets having identifiers for identifying the respective wireless devices.

13. A method according to claim 10, and further comprising the step of visually indicating and identifying alarm signals from resident and attendant wireless devices.

14. A method according to claim 10, and further comprising the step of printing a report of alarms and response times.

* * * * *